(12) United States Patent
DeBoynton et al.

(10) Patent No.: US 6,173,106 B1
(45) Date of Patent: Jan. 9, 2001

(54) FIBER COUPLER VARIABLE OPTICAL ATTENUATOR

(75) Inventors: William L. DeBoynton, Santa Ana; Michael Uschitsky, Irvine, both of CA (US)

(73) Assignee: Corning Incorporated, Corning, NY (US)

( * ) Notice: Under 35 U.S.C. 154(b), the term of this patent shall be extended for 0 days.

(21) Appl. No.: 09/394,558

(22) Filed: Sep. 10, 1999

Related U.S. Application Data

(60) Provisional application No. 60/100,004, filed on Sep. 11, 1998.

(51) Int. Cl.[7] ................................................. G02B 6/00
(52) U.S. Cl. ................................ 385/140; 385/37; 385/43
(58) Field of Search ............................... 385/15, 25, 37, 385/43, 19, 52, 134, 140

(56) References Cited

U.S. PATENT DOCUMENTS 5,649,036 * 7/1997 Abderson et al. ....................... 385/25
6,101,301 * 8/2000 Engelberth et al. .................... 385/37

* cited by examiner

*Primary Examiner*—Thong Nguyen
*Assistant Examiner*—Euncha Cherry
(74) *Attorney, Agent, or Firm*—William Greener; Daniel P. Malley

(57) ABSTRACT

A fiber coupled variable optical attenuator includes an optical fiber coupler mounted through a low modulus material bushing into a protective enclosure with one end clamped and another end free. The free end of the coupler is deflected by a motorized mechanism. The mechanism includes an electric step motor, a shaft providing eccentric motion, and a support/deflection component connected with the coupler in a kinematic chain providing lateral deflection of the coupler's free end. The structural and material parameters of the kinematic chain members are established to satisfy conditions of thermal compensation for the enclosure enveloping this chain. The free end of the coupler is equipped with a sleeve having a spherical polished surface positioned in contact with the deflection component. The enclosure is equipped with a thermal-compensating device positioned in series between the enclosure and optical fibers.

21 Claims, 5 Drawing Sheets

FIBER COUPLER VARIABLE OPTICAL ATTENUATOR

This application is a continuation of provisional application Ser. No. 60/100,004, filed on Sep. 11, 1998.

FIELD OF THE INVENTION

The present invention relates to an optical attenuating device and more particularly to a thermally compensated, fiber coupler, variable optical attenuator (VOA).

BACKGROUND OF THE INVENTION

VOAs of various designs are widely used in the local and long distance telephone networks. Applications of these devices include, e.g., light filters, switches, splitters, combiners/couplers of light signals, light multiplexers, etc. It is expected that thermally compensated, fiber coupled, VOA's will become vital for the development of high performance telecommunication systems. The ability to design viable and reliable packages, which might be subjected to various thermal and mechanical loads during 20–25 years of their projected service life, is of practical importance.

Optical systems utilizing fiber coupled variable taps are already known (see, e.g., Miller et al. U.S. Pat. No. 5,146,519 entitled "Rotary Variable Optical Tap"; Keck et al. U.S. Pat. No. 5,353,363 entitled "Optical Fiber Bendable Coupler/Switch Device"). The variable attenuation of the light signal is achieved by bending or rotational (torsional) loading of a bi-conical coupler comprising a pair of optical fibers fused together at a narrowed region. Typically, the coupler is bent in the narrowed region, whereby a coupling ratio can be selected. Structurally, fiber coupled variable optical attenuating (FC-VOA) packages are multi-material assemblies in which the material interactions, their sizes and configurations, and the loads, whether thermally induced or mechanical, are as important as the performance characteristics of the employed materials. The thermal contraction mismatch of the fused silica glass used in the biconical coupler and fibers relative to the enclosure materials (metal alloys or packaging plastics), including adhesives, results in thermally induced stresses that affect the light attenuation and control thereof. In order to minimize the adverse effect of thermally induced stresses in the fused coupler caused by the thermal contraction mismatch between the fused glass coupler, the loading mechanism, and the enclosure, the fiber may be mechanically tuned by alignment techniques. The tuning, however, results in a new temperature dependent change in the light attenuation caused by the combined action of the thermal mismatch and the tuning induced misalignments. The loading devices used in FC-VOA packages tend to not be fully thermally compensated and therefore produce additional mismatch stresses when assembled in the protective enclosure. These packages are also sensitive to mechanical shock and vibrations and, therefore, reproducibility of the coupling ratio varies over time. In addition, FC-VOA packages containing loading devices providing variable bending or rotation are very expensive to manufacture.

It is desirable to obtain a high accuracy, totally thermally self-compensated fiber coupled variable optical attenuating system that can be easy-tunable over large deflection and temperature ranges, is relatively inexpensive, which is made from commercially available and easily machinable materials, and which will be reliable in operation. In addition to this, the enclosure design should be adequate not only to mechanically protect the brittle glass components but also to compensate for and minimize the possible thermally induced shift in the optical attenuation.

SUMMARY OF THE INVENTION

The present invention is directed to a variable optical attenuator. In an embodiment of the invention, a fiber coupled variable optical attenuator includes a fused bi-conical silica glass coupler comprising a pair of optical fiber waveguides that are fused together at a narrowed, waist region. The coupler is mounted into a protective enclosure with one end of the coupler fixed to the enclosure and one end free. The enclosure is made from metal alloys or packaging plastics.

In order to reduce the thermal mismatch stresses localized in the clamped portion of the coupler, the coupler is mounted through a low modulus material bushing which acts as a stress-reducing buffer. The free end of the coupler is deflected using a motorized mechanism. The mechanism includes an electric step motor, an eccentric motion producing shaft and a push rod that is perpendicular to the motor and shaft, connected in series. The end of the push rod engages the coupler through a V-groove in contact with a spherically shaped sleeve around the free end of the coupler. The kinematic chain formed by the motor, shaft, push rod and coupler mechanically transfers the rotational motion of the motor through the axial motion of the rod to the lateral deflection of the coupler's free end. The dimensions and thermo-mechanical parameters of the chain members and the enclosure are established to satisfy conditions of nearly total thermal compensation within the enclosure enveloping this chain. Total thermal compensation can be defined here as sufficient dimensional stability of the optical device such that changes in the VOA output due to temperature change are negligible in use. The motorized mechanism is also equipped with a rigid frame that limits axial deflection of the coupler and protects it from excessive deflections caused by mechanical shocks associated with accidental drops when mishandled or during shipping. The free end of the coupler is equipped with a sleeve having a spherical polished surface positioned in contact with the end of the push rod. The contact sleeve is designed to thermally compensate the axial expansion of the enclosure due to the temperature change and to transfer the vertical (axial) motion of the push rod into lateral elastic deflection of the coupler. The moving portion of the coupler is balanced with respect to the geometrical center of the spherical surface of the contact sleeve to protect the coupler when mechanically shock-excited.

In order to reduce the thermal stresses in the fiber waveguides, the enclosure is also equipped with thermal compensating devices positioned in series between the enclosure and optical fibers exiting the enclosure. The thermal compensating device is a bi-material laminate cylinder that includes several thin material layers (e.g., washers) made from a low elastic modulus, high thermal expansion coefficient material (e.g., RTV silicone), and separated by metal disks, and is provided with a central aperture coinciding with the axis of the fiber waveguide. With the proper selection of the thermo-elastic properties of the materials as well as dimensions of the layers, the thermal compensating device added to the chain dramatically reduces the thermal strain in the fiber that is inevitably present. The function of the metal disk is to limit the deflection of the elastomer under conditions of loads externally applied to the fiber. A thick single elastomer washer will deflect under load more than two washers of half thickness if the washers are bonded to high elastic modulus materials that limit lateral deformation of the elastomer. The fiber is fixedly bonded to the innermost member of the thermal compensator that is in turn carried through the laminated layers of elastomer and metal. The outer member is fixedly bonded to the enclosure. This arrangement allows relative motion between inner and outer members, which is caused by thermal expansion/contraction of the materials in such manner as to maintain a fixed dimensional relationship between the inner member and the optical fused coupler.

In another embodiment of the invention, a device for variably attenuating an optical signal transmitted through the device includes an enclosure for the device; an optical fiber coupler having a first end section, a second end section, and a waist section between the first and second end sections; a sleeve encircling at least a portion of the first end section; a clamping structure for fixedly securing the first end section of the coupler with respect to a mounting surface of the enclosure; a sleeve encircling a portion of the second end section of the coupler; a motor connected to the mounting surface of the enclosure; a shaft mounted in rotatable cooperation with the motor; a support for the second end section of the coupler in cooperative engagement at one end with the shaft for deflecting the second end section of the coupler; a travel stop for limiting a travel direction of the support in a given direction; and a thermal compensating component having an aperture, disposed in series alignment with an end section of the coupler, wherein a coupler fiber extends through the aperture and is fixedly attached to the thermal compensating component about the aperture, whereby deflection of the second end section of the coupler variably effects a transmission loss through the coupler.

In an aspect of this embodiment, the clamp structure for fixedly securing the first end section of the coupler with respect to a mounting surface of the enclosure comprises a rigid clamping component cooperatively engaging the sleeve encircling the first end section.

In another aspect, the sleeve encircling a portion of the second end section of the coupler includes a polished, spherical external surface cooperatively engaging the support means.

In another aspect, the shaft has an off-center axis of rotation such that it provides eccentric motion upon rotation.

In another aspect, the travel stop for limiting a travel direction of the support comprises a mechanical stop.

In another aspect, the thermal compensating component comprises a bi-material laminate structure including a layer of low elastic modulus (150–500 psi), high thermal expansion ($150 \times 10^6/°$ C. to $300 \times 10^6/°$ C.$^{-1}$) material immediately adjacent a metal layer material attached thereto, attached to a housing that is further attached to the enclosure.

In another aspect, the coupler comprises a fiber output port for monitoring optical power.

In another aspect, the device includes a latching mechanism such that an output signal transmitted through the device is substantially constant when the device experiences an electrical power loss.

In another aspect, the device includes a material or component for restraining uncontrolled motion of the support means.

BRIEF DESCRIPTION OF THE DRAWINGS

The present invention will be described in more detail below with reference to the accompanying drawings.

DETAILED DESCRIPTION OF PREFERRED EMBODIMENTS OF THE INVENTION

Figure 1:
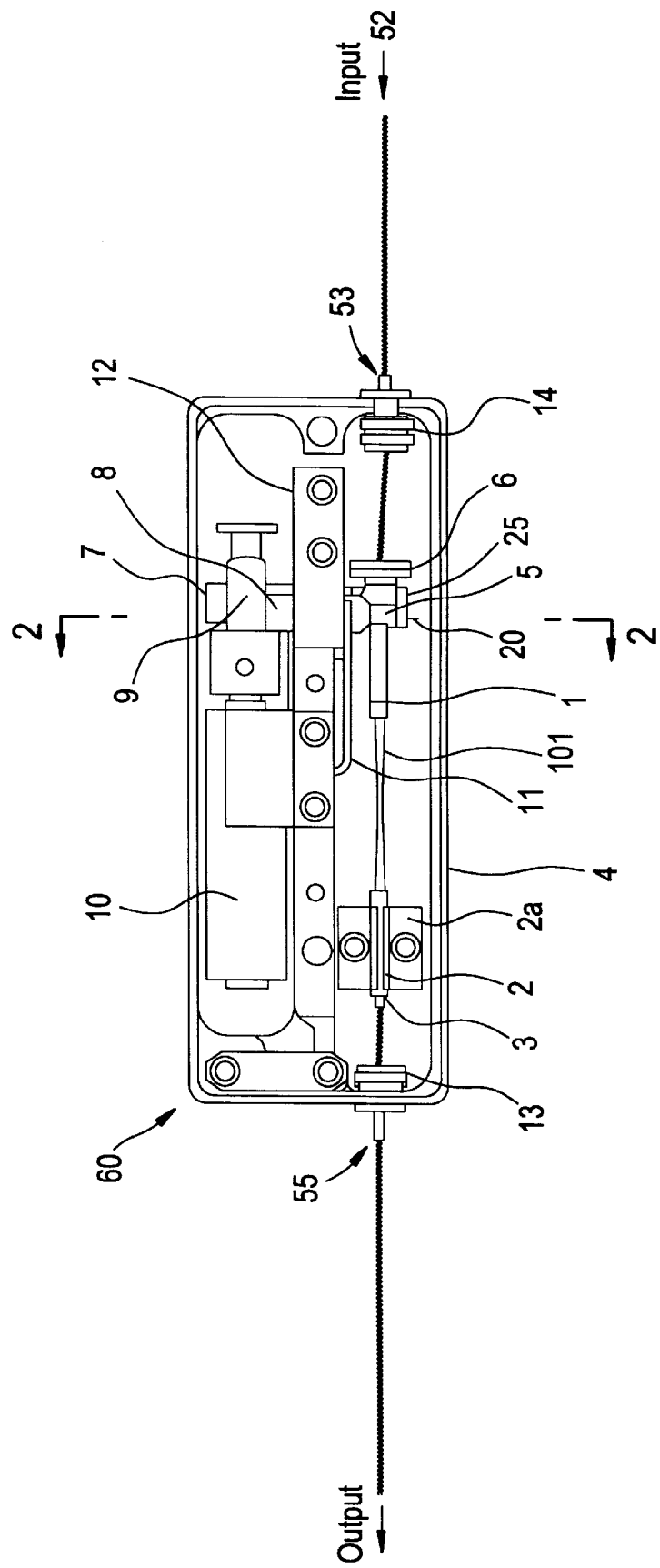
FIG. 1 is a top view of an embodiment of the VOA invention with the cover of the enclosure removed.
Figure 2:
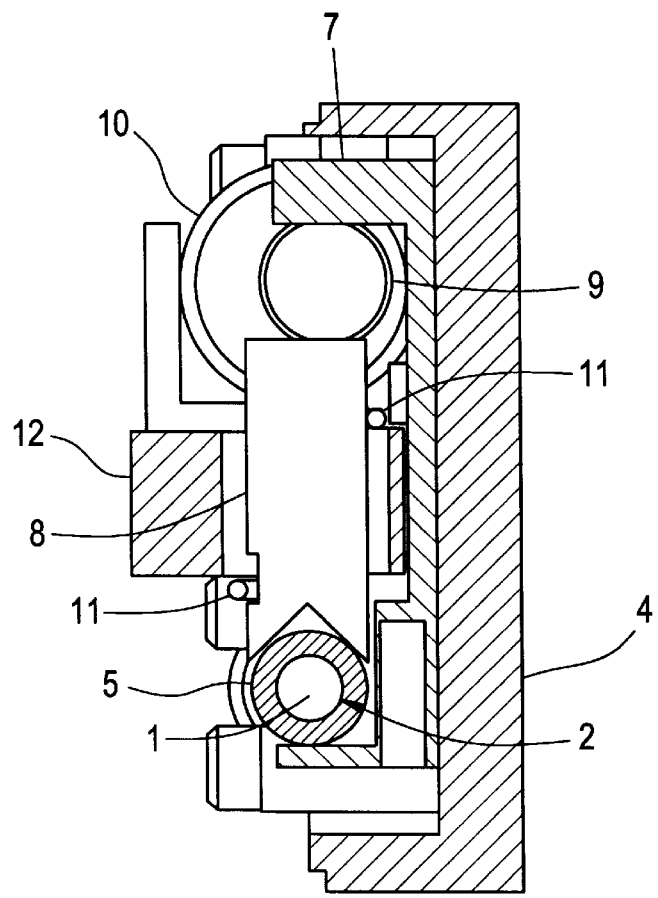
FIG. 2 is a cross sectional view of the embodiment of FIG. 1 through section 2—2.
Figure 4:
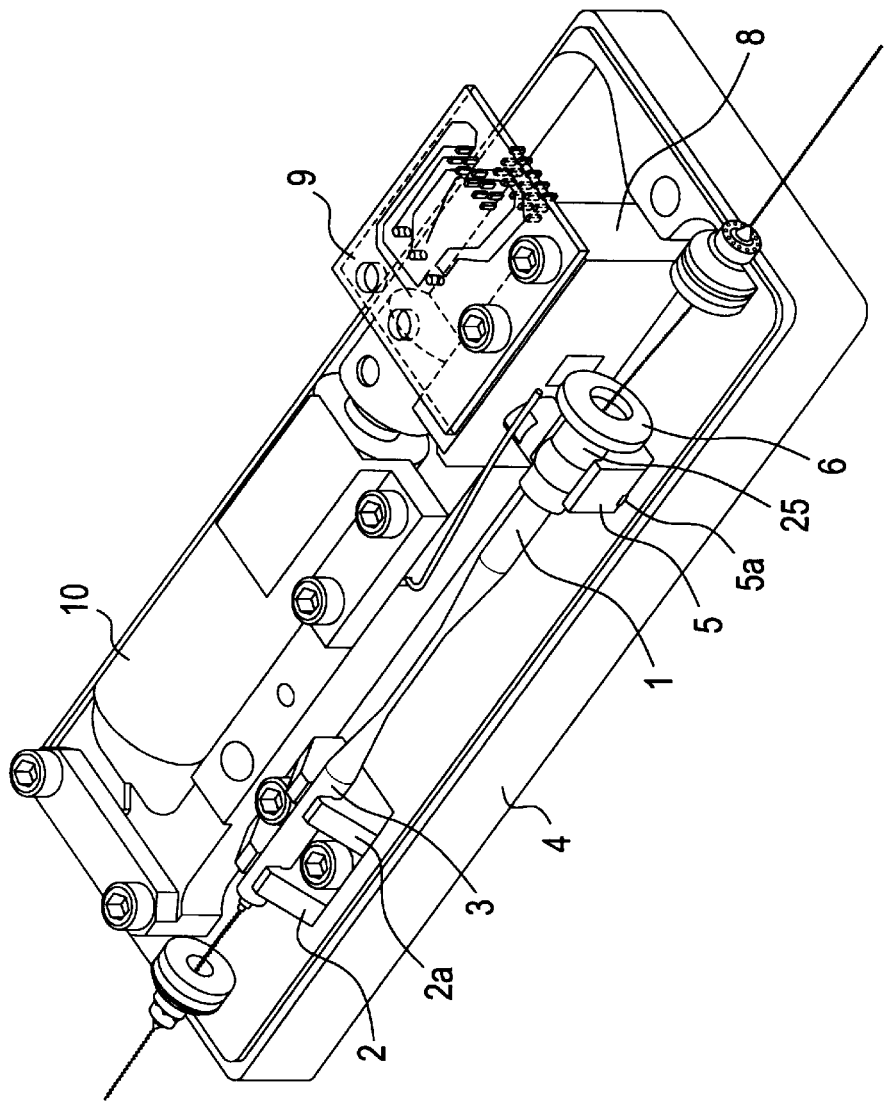
FIG. 4 is a perspective illustration of the VOA of the embodiment of FIG. 1.

Referring to FIGS. 1, 2 and 4, in which like reference numerals represent like parts of a VOA 60 according to the invention, an optical source (not shown) provides a broadband light signal to the input 52 of the VOA and on to a fused bi-conical silica glass coupler 101 having a free, second end section 1 and a fixed, first end section 3 that is mounted into a clamp block 2a through a low modulus material bushing 2. This bushing is preferably an RTV silicone material that provides, among other features, a stress-reducing buffer against mechanical shock. The coupler 101 is mounted into a protective enclosure 4, which preferably is aluminum, more preferably aluminum alloy 6061. A portion of the second end section 1 of the coupler 101 is encircled by a sleeve 5a including a polished spherical surface 5. A balancing counterweight 6 also encircles a portion of the second end section adjacent the sleeve 5a.

A kinematic chain formed by a motor 10, preferably a micro-step motor such as is available from, e.g., Arsape in Switzerland and which is provided with latching capability, a shaft 9, a push rod 8, and the coupler 101, mechanically transfers the rotational motion of the motor through the axial motion of the rod to the lateral deflection of the coupler free end. The shaft 9 preferably has a circular cross section with a centrally offset longitudinal axis of rotation for providing eccentric motion upon rotation to produce a desired lateral deflection of the coupler. A spring 20 between a side wall of the enclosure and the coupler support 25 provides a force to move the second coupler end into a substantially undetected position when the push rod is not actuated. The VOA 60 is also equipped with a rigid frame 7 that limits the axial deflection of the coupler and protects it from excessive deflections caused by mechanical shocks associated with mishandling. A block 12 for guiding the push rod 8 has a central guiding hole and two side ports (not shown). Two guide points (not shown) at each end of the guiding hole guide the axial motion of the push rod 8 inside the block 12. A spring 11 urges the rod 8 into contact with the guiding points of block 12 and also provides anti-rotation control of the push rod.

Figure 3:
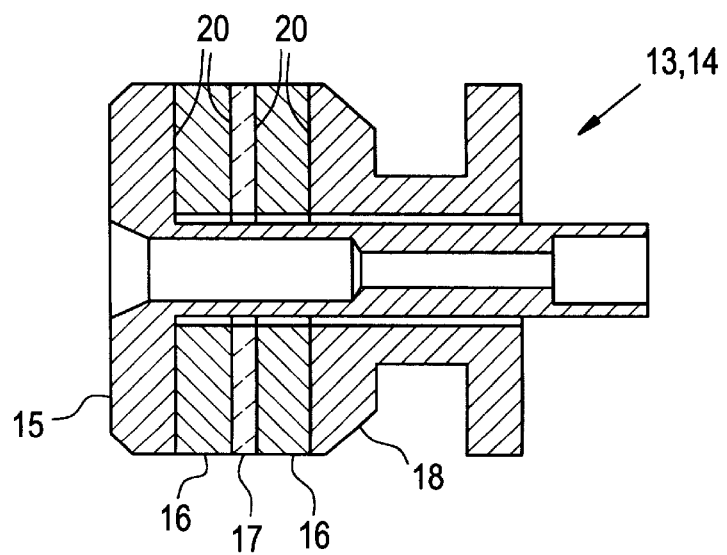
FIG. 3 is a cross-sectional view of an embodiment of the thermal-compensating component of the VOA invention.

The VOA is also equipped with thermal and stress compensating devices 13 and 14 which are positioned in series between the enclosure 4 and fiber input/output interconnections 53, 55. The thermal compensators are bi-material laminate cylinders as shown in FIG. 3. They include a plurality of thin material layers (e.g., washers) 16 made from low elastic modulus (150–500 psi) and high thermal expansion coefficient (150–300 $10^6/°$ C.$^{-1}$) material, separated by metal disks 17 which are adhesively bonded or vulcanized on interfacial surfaces 20 to a housing 15. The housing is in turn adhesively bonded to the input fiber and an output fiber pigtail co-axially connected with the housing 18 attached to the protective enclosure 4. The thermal/stress compensator is provided with a central aperture coinciding with the axis of the input and output fiber waveguides. With the proper selection of material properties and dimensions of the washers based on the thermal and stress analyses of this laminate, the thermal and stress-compensating device added to the chain can dramatically reduce the thermal mismatch strain in the fiber and the inevitable strain caused by the fiber offset position.

Conceptually, a glass coupler with the incorporated fibers, a metal or plastic enclosure, adhesive material layers, and a kinematic mechanism as described above, form a thermostat-type mechanical system that experiences residual thermally induced stresses due to the inevitable thermal contraction mismatches. In addition to this, the coupler positioned with the end offset will experience additional bending stresses due to the various materials. These thermally induced stresses may affect the variable attenuation and insertion losses in an optical system.

Figure 5:
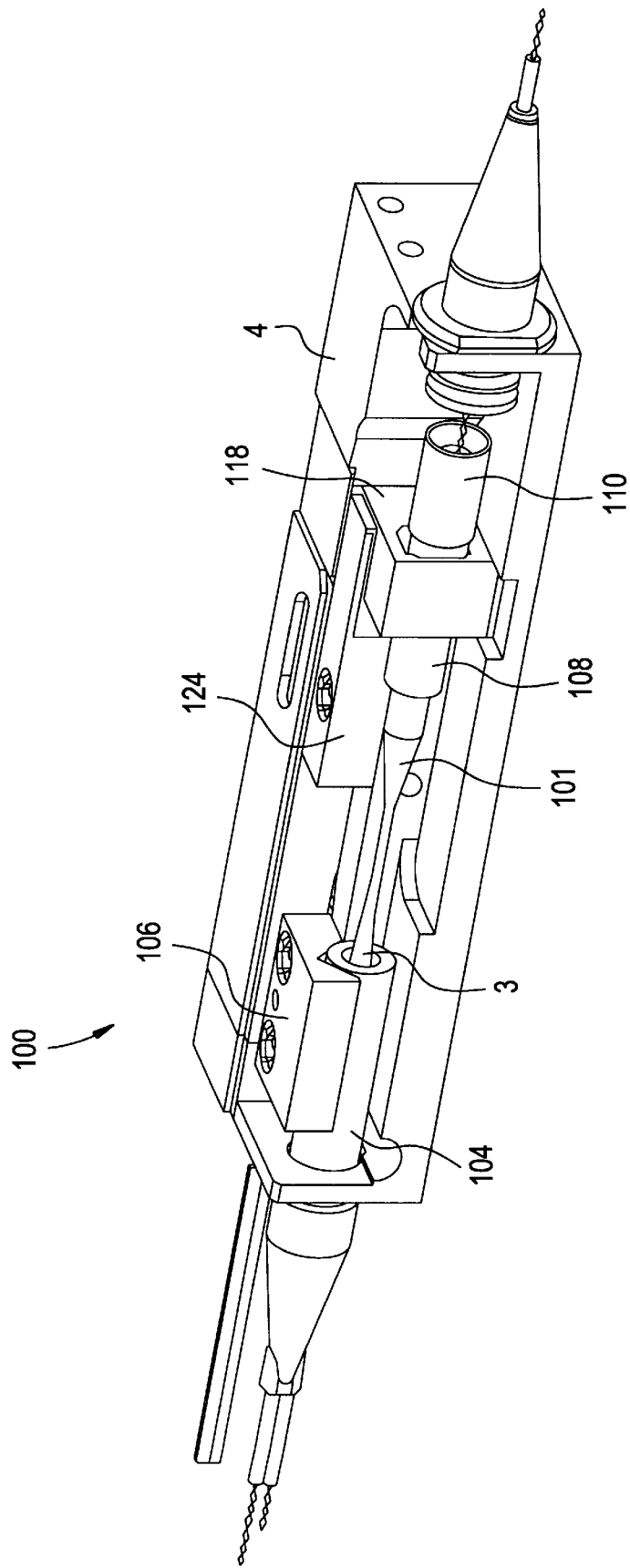
FIG. 5 a perspective illustration of another embodiment of the VOA of the invention; an FIG. 6 is a break-apart view of the VOA of FIG. 5.
Figure 6:
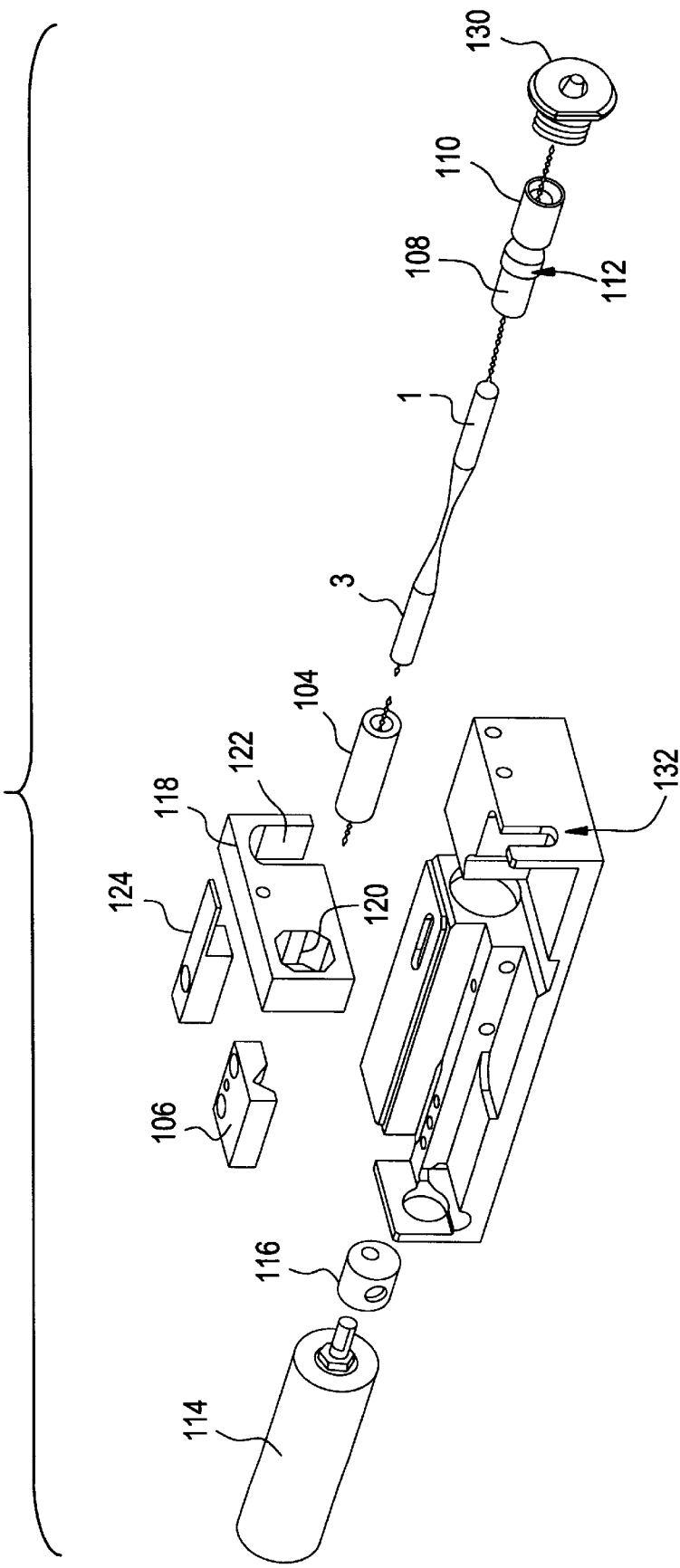

In another embodiment of the invention illustrated with reference to FIGS. 5–6, a fiber coupler VOA 100 includes an enclosure 4 upon which is mounted a fused fiber coupler 101. The coupler 101 has a first end section 3, a second end section 1, and a waist section intermediate the first and second ends. A sleeve 104 encircles the first end section 3 and is fixedly secured to the enclosure 4 by a mounting bracket 106. Another sleeve 108 encircles a portion of the second end section 1 of the coupler, and a sleeve extension 110 having a larger diameter than sleeve 108 encircles the coupler end section 1 adjacent sleeve 108. A portion of sleeve 108 preferably has a polished spherical exterior surface 112 that facilitates the preferred curved path bending motion of the coupler upon displacement. A motor 114 is connected to the mounting surface of the enclosure, and a shaft 116 is mounted in rotatable cooperation with the motor. The motor is preferably an electrically powered, reversible, latching step motor such as that described above. The shaft 116 has an axis of rotation that is offset from center as shown in FIG. 6 for providing eccentric motion. A structure 118 supports the free end section of the coupler and acts as a force transfer mechanism for the device similar to the push rod 8 of the first described embodiment. Structure 118 has an aperture 120 that supports the coupler free end by engaging the spherical sleeve portion 112. The structure 118 also has U-shaped aperture 122 which straddles the cam 116 such that rotational motion of the off-center cam moves structure 118 laterally and thus deflects the free end section of the coupler. A bracket 124 attached to the enclosure includes a cantilevered section that prevents uncontrolled motion of structure 118. Structure 118 also is provided with a pin (not shown) extruding laterally therefrom which cooperatively engages a set screw (not shown) and which acts as a mechanical stop for structure 118 for travel in the undeflected direction of the coupler end. The device also includes a thermal compensating component 130 that is identical to device 13, 14 of FIG. 3. Component 130 engages slot 132 in an end of the enclosure.

The embodiments of the invention described above illustrate a design approach to an optical component that utilizes three systems of thermal compensation to achieve nearly temperature-independent control of attenuation. These are: 1) overall thermal compensation of the kinematic chain on the enclosure enveloping this chain; 2) local thermal compensation by the load transfer contact sleeve device 5, 112; and, 3) the thermal stress compensator 13, 14; 130, positioned in series between the optical fibers and the enclosure. The desirable attenuation is achieved by using the described thermal compensated loading mechanism. The prediction of the tolerable insertion loss shift is based on the analysis of overall stresses in the structural members of the assembly and local mismatch stresses in the bonded regions comprised of dissimilar materials. This offers the prospect of operation at a very low level of thermal sensitivity in attenuating packages.

A number of additional advantages have been gained by using the above type attenuation package. The enclosure materials used in the present invention are inexpensive and the thermo-mechanical behavior of those materials is well understood and predictable. The electrical interface uses a simple four-lead design that allows for increment, decrement and reset. The attenuating packages can be precision machined.

Although the invention has been described in detail for the purpose of illustration, it is understood that such detail is solely for that purpose, and variations can be made therein by those skilled in the art without departing from the spirit and scope of the invention that is defined by the following claims.

We claim:

1. A device for variably attenuating an optical signal transmitted through the device, comprising:

an enclosure;

an optical fiber coupler having a first end section, a second end section, and a waist section intermediate the first and second ends, disposed in the enclosure, wherein the first end section of the coupler is fixedly attached in the enclosure;

a sleeve encircling a portion of the second end section of the coupler;

a counterweight connected to a portion of the second end of the coupler;

a motor disposed within the enclosure;

a shaft mounted in rotatable cooperation with the motor;

a support structure for the second end section of the coupler;

a component for providing a restoring force against the support structure for counteracting a deflection of the second end section of the coupler;

a force transfer member in cooperative engagement at one end with the shaft and at an opposite end with the sleeve for exerting a lateral force against the second end section of the coupler;

a component connected to a mounting surface of the enclosure having an aperture through which the force transfer member passes and which has a size such that it provides a guide path for axial motion of the force transfer member, and a stress and thermal-compensating component having an aperture therethrough disposed in serial alignment with an end section of the coupler, wherein a coupler fiber extends through the aperture and is fixedly attached to the thermal compensating component about the aperture, whereby deflection of the second end section of the coupler variably effects a transmission loss through the coupler.

2. The device of claim 1, wherein the first end section of the coupler is fixedly secured by a clamping component.

3. The device of claim 1, wherein the sleeve includes a polished, spherical external surface.

4. The device of claim 1, wherein the counterweight encircles a portion of the second end section of the coupler.

5. The device of claim 1, wherein the shaft has an off-center axis of rotation.

6. The device of claim 3, wherein the force transfer member is a push rod having a V-groove in an end thereof in cooperative engagement with the spherical surface of the sleeve.

7. The device of claim 6, wherein the component connected to the mounting surface of the enclosure includes a guide point at each opposite axial end in the aperture for guiding the axial motion of the push rod through the aperture, and further comprising a spring connected to the enclosure and having a section cooperatively engaging the push rod for urging the push rod into contact with the guide points.

8. The device of claim 1, wherein the thermal and stress-compensating component comprises a bi-material laminate structure including a material layer having an elastic modulus of between about 150–500 psi and a thermal expansion coefficient of between about $150 \times 10^6/°C.^{-1}$ and $300 \times 10^6/°C.^{-1}$, immediately adjacent a metal material layer attached thereto, that is attached to a housing, wherein the housing is attached to the enclosure.

9. The device of claim 1, further comprising a power connection for the motor.

10. The device of claim 1, wherein the coupler comprises a fiber output port for monitoring optical power.

11. The device of claim 1, wherein the motor further comprises a latching mechanism which holds an output signal transmitted through the device substantially constant when the device experiences an electrical power loss.

12. The device of claim 1, further comprising an optical sensor and associated means for controlling the extent of deflection of the coupler.

13. A device for variably attenuating an optical signal transmitted through the device, comprising:

an enclosure;

an optical fiber coupler having a first end section, a second end section, and a waist section intermediate the first and second ends;

a sleeve encircling the first end section;

a clamp for fixedly securing the first end section of the coupler to a mounting surface of the enclosure;

a sleeve encircling a portion of the second end section of the coupler;

a motor connected to the mounting surface of the enclosure;

a shaft mounted in rotatable cooperation with the motor;

a support for the second end section of the coupler, said support being in cooperative engagement at one end with the shaft for deflecting the second end section of the coupler;

a travel stop for limiting a travel direction of said support in a given direction; and a thermal compensating component having an aperture therethrough disposed in serial alignment with an end section of the coupler, wherein a coupler fiber extends through the aperture and is fixedly attached to the thermal compensating component about the aperture, whereby deflection of the second end section of the coupler variably effects a transmission loss through the coupler.

14. The device of claim 13, wherein the sleeve encircling a portion of the second end section of the coupler includes a polished, spherical external surface cooperatively engaging the support.

15. The device of claim 14, further comprising another sleeve encircling a portion of the second end section of the coupler adjacent the sleeve encircling a portion of the second end.

16. The device of claim 13, wherein the shaft has an off-center axis of rotation such that it provides eccentric motion upon rotation.

17. The device of claim 13, wherein the travel stop comprises a mechanical stop.

18. The device of claim 13, wherein the thermal compensating component comprises a bi-material laminate structure including a material layer having an elastic modulus between about 150–500 psi and a thermal expansion coefficient between about $15010^6/°C.^{-1}$ and $300 \times 10^6/°C.^{-1}$, immediately adjacent a metal material layer attached thereto, that is attached to a housing which is further attached to the enclosure.

19. The device of claim 13, wherein the coupler comprises a fiber output port for monitoring optical power.

20. The device of claim 13, wherein the motor further comprises a latching mechanism such that an output signal transmitted through the device is substantially constant when the device experiences an electrical power loss.

21. The device of claim 13, further comprising a component for restraining uncontrolled motion of the support.

* * * * *